United States Patent
Russell et al.

(10) Patent No.: US 6,704,326 B2
(45) Date of Patent: Mar. 9, 2004

(54) PAYLOAD MAPPING IN SYNCHRONOUS NETWORKS

(75) Inventors: John Paul Russell, Sawbridgeworth (GB); Christopher David Murton, Chelmsford (GB); David Michael Goodman, St Albans (GB); Christopher Ramsden, Hertford (GB); James Shields, Carrickfergus (IE)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/230,050

(22) Filed: Aug. 28, 2002

(65) Prior Publication Data

US 2003/0012218 A1 Jan. 16, 2003

Related U.S. Application Data

(63) Continuation of application No. 09/143,465, filed on Aug. 27, 1998.

(51) Int. Cl.[7] ............................................... H04L 12/50
(52) U.S. Cl. ...................... 370/466; 370/907; 370/365
(58) Field of Search .................... 341/50, 55, 61, 341/95; 370/474, 476, 498, 902, 903, 905, 907, 912, 914, 916, 442, 445, 464, 465, 466, 469, 470, 471, 472, 503, 509, 510, 536, 537

(56) References Cited

U.S. PATENT DOCUMENTS

| | | | | | |
|---|---|---|---|---|---|
| 5,206,858 | A | * | 4/1993 | Nakano et al. | 370/94.1 |
| 5,251,239 | A | * | 10/1993 | Turban et al. | 375/114 |
| 5,274,680 | A | * | 12/1993 | Sorton et al. | 375/118 |
| 5,361,261 | A | * | 11/1994 | Edem et al. | 370/85.3 |
| 5,446,734 | A | * | 8/1995 | Goldstein | 370/60.1 |
| 5,754,545 | A | * | 5/1998 | Shinbashi et al. | 370/360 |
| 5,991,308 | A | * | 11/1999 | Fuhrmann et al. | 370/474 |
| 6,014,708 | A | * | 1/2000 | Klish | 709/232 |
| 6,058,119 | A | * | 5/2000 | Engbersen et al. | 370/466 |
| 6,157,658 | A | * | 12/2000 | Toyoyama et al. | 370/505 |
| 6,160,819 | A | * | 12/2000 | Partridge et al. | 370/474 |

FOREIGN PATENT DOCUMENTS

| | | | | |
|---|---|---|---|---|
| EP | 0 656 704 A1 | 6/1995 | | H04J/3/16 |
| WO | WO 98/04072 | 1/1998 | | H04L/12/46 |

* cited by examiner

Primary Examiner—Kenneth Vanderpuye
(74) Attorney, Agent, or Firm—Barnes & Thornburg

(57) ABSTRACT

There is disclosed a method of carrying frame based data, eg Ethernet data, over a synchronous digital hierarchy network in order to provide local area network type functionality over a wide area network coverage. Specific embodiments disclose methods of mapping Ethernet data frames into SDH virtual containers, and distinguishing start and end boundaries of the Ethernet data frames within the virtual container payloads, by a selection of encoding methods including a segmentation, pointer methods, bit stuffing methods and byte stuffing methods. Data frames are encoded with a code which designates a boundary of each frame, and the encoded frames are input into a synchronous data channel.

19 Claims, 15 Drawing Sheets

| Code | Followed by | Meaning |
|---|---|---|
| 0x00 | (not applicable) | (not allowed) |
| 0x01 | Nothing | A single zero byte |
| 0x02 | One data byte | The single data byte, followed by a single zero |
| 0x03 | Two data bytes | The pair of data bytes, followed by a single zero |
| 0x04 | Three data bytes | The three data bytes, followed by a single zero |
| " | (n-1) data bytes | The (n-1) data bytes, followed by a single zero |
| 0xFD | 252 data bytes | The 252 data bytes, followed by a single zero |
| 0xFE | 253 data bytes | The 253 data bytes, followed by a single zero |
| 0xFF | 254 data bytes | The 254 data bytes, followed by a single zero |

*Fig. 15*

PAYLOAD MAPPING IN SYNCHRONOUS NETWORKS

RELATED APPLICATION

This application is a continuation of copending U.S. patent application Ser. No. 09/143,465 filed Aug. 27, 1998.

FIELD OF THE INVENTION

The present invention relates to synchronous networks, and to the carrying of frame based data over synchronous networks.

BACKGROUND TO THE INVENTION

In the applicant's co-pending patent application entitled "Frame Based Data Transmission over Synchronous Digital Hierarchy Network" filed contemporaneously with the present application, and a copy of which is filed herewith, there is disclosed a method of carrying frame based data over a synchronous digital network. Such disclosed system may provide OSI layer 2 switching functionality which was only previously available in prior art local area networks, but extended over a geographical coverage area which has been historically considered to have been provided only by prior art wide area networks.

In order to accommodate datacoms frame based data, which is characterized by its own set of data rates and control data characteristics, and to contain such frame based data in conventional synchronous digital networks, there is a problem that the frame based datacoms data rates are not well matched to conventional telecoms data rates, for example E1, E3, T1, STM-1 data rates.

Several prior art attempts have been made to carry datacoms services including frame based data over telecoms networks. Prior art systems for incorporating frame based data over synchronous networks include schemes which contain Ethernet data frames in asynchronous transfer mode (ATM) cells which are then transported in a plesiochronous mode and which may then be transported according to ITU-T recommendation G.708 in a synchronous digital hierarchy (SDH) network. In this scheme, known as Inverse Multiplexing of ATM (IMA), conceived by the ATM Forum, an ATM circuit is divided by multiplexing individual ATM cells, which are input into a plurality of E1 circuits. This enables an ATM signal to be carried across a legacy network, for example a plesiochronous digital hierarchy (PDH) network. Ethernet frames are included as the payload of the ATM cells, which are then carried via the E1 circuits over a conventional PDH network which can be carried over an SDH network. A protocol stack for an inverse multiplexing of ATM scheme between first and second physical resources A and B carried over a synchronous digital network channel 100 is illustrated in FIG. 1 herein. Internet protocol packets (IP) are encapsulated using request for comment (RFC) 1483 protocol into asynchronous transfer mode cells. RFC 1483 is published by Internet Engineering Task Force, the location and Internet address of which is well known to those skilled in the art. The ATM cells are then inverse multiplexed, by dividing them up and entering them into ITU-T G.703 plesiochronous digital hierarchy bitstreams, which are then carried in virtual containers over a synchronous digital hierarchy synchronous channel 100. De-layering of the SDH payloads at the receiving entity is achieved as a reverse of layering of the Internet protocol packets. However, this prior art scheme has a disadvantage of a high packetization header overhead, which can comprise up to 20% of the SDH payload. Each layer of packetization and encapsulation also adds delay to the data traffic carried.

Other prior art attempts at carrying frame based data over synchronous networks include a system known as media independent interface, produced by CISCO and a similar system produced by Bay Networks. Another prior art system aimed at carrying frame based data over synchronous digital network is the Packet On Site (POS phy) system of PMC Sierra. However, in each of these schemes, a high packetization overhead is present and packaging delays are relatively high, which slows down passage of datacoms data through a network.

SUMMARY OF THE INVENTION

One object of the present invention is to provide a means and method for efficiently mapping datacoms type data produced at frame based data rates in packetized format, into a synchronous digital virtual container system for transport of the frame based data over a synchronous digital network.

Ideally, frame based data is incorporated into a synchronous digital network with a minimum packing delay in containing the frame based data in the synchronous digital containers.

A further object of the present invention is to multiplex a plurality of frame based data channels, into a synchronous digital network channel.

A further object of the present invention is to achieve containment of frame based data directly into synchronous digital network containers, with a minimum protocol header overhead.

According to one aspect of the present invention there is provided a method for transporting frame based packet data into a synchronous transmission communications network, said method comprising the steps of:

encoding at least one packet data frame with a code which designates a boundary of said frame;

inputting said encoded packet data frame into a synchronous data channel.

The synchronous communications protocol, for example SDH protocol under ITU-T recommendation G.70X recognizes the code as marking a boundary of a packet data frame.

Said step of encoding at least one packet data frame may comprise:

appending a fixed pointer describing a position of a said boundary within a data stream containing said packet data frame, said fixed pointer appended into said synchronous digital channel.

A said fixed pointer comprises a pointer designating an end of said packet data frame, or a start of said packet data frame.

The pointer preferably designates a position of a said boundary within a synchronous virtual container, of a synchronous network.

The step of encoding at least one packet data frame may alternatively comprise:

partitioning said packet data frame into a plurality of bytes;

for each byte appending an extra bit indicating that said corresponding respective byte comprises part of said packet data frame; and for a last byte of said packet data frame, appending an extra bit indicating that said byte constitutes a last byte of said data frame.

The step of encoding at least one packet data frame may comprise applying a consistent overhead byte stuffing algorithm to said data frame.

This may have an advantage that an encoding delay incurred by encoding the packet data frame with the byte stuffing algorithm is of known and predetermined duration.

Said step of encoding at least one packet data frame may comprise:

applying a coding algorithm to said packet data frame which identifies a boundary of said data frame by appending a fixed number of bits to said data frame, irrespective of a size of said data frame.

Said step of encoding at least one packet data frame may comprise:

applying a coding algorithm to said data frame which identifies a boundary of said data frame by appending a fixed number of bits to said data frame, irrespective of a data content of said data frame.

Preferably said step of inputting said encoded packet data frame into a synchronous data channel comprises inputting said data frame into at least one virtual container.

According to a second aspect of the present invention there is provided a method of receiving frame based data carried in a synchronous transmission communications network comprising the steps of:

recovering a stream of encoded data from a synchronous digital channel;

identifying in said recovered data stream at least one marker designating a boundary of a data frame; and using said marker to recover said data frame from said data stream.

According to a third aspect of the present invention there is provided a method of carrying packet data frames over a synchronous digital hierarchy network, said method comprising the steps of:

delineating a plurality of said data frames from a received packet data frame bit sequence;

marking at least one boundary of each said packet data frame; and incorporating each said encoded, marked packet data frame into at least one synchronous virtual container.

According to a fourth aspect of the present invention there is provided a method of decoding encoded packet frame data.

According to a fifth aspect of the present invention there is provided apparatus for incorporating frame based data into a synchronous transmission communications network, said apparatus comprising:

means for encoding a plurality of data frames with a plurality of markers designating boundaries of said data frames; and means for multiplexing said encoded data frames into a synchronous virtual container.

The invention includes a method of encoding frame based data into a format suitable for inclusion into a virtual container of a synchronous digital network, said method comprising the steps of:

dividing said packet data frame into a plurality of data blocks, each having a predetermined number of bits;

for each said data block, appending an extra bit to said data block, said extra bit designating that said data block comprises said packet data frame; and for a last data block of a said packet data frame, appending a second bit, said second bit designating said last data block as an end of said packet data frame.

The invention includes a method of decoding an encoded digital bitstream to recover a plurality of packet data frames, said method comprising the steps of:

receiving a digital bitstream comprising a plurality of data blocks, each said data block having an additional appended bit designating whether said data block belongs to a packet data frame or not;

for each said data block, checking said extra bit to determine whether said corresponding respective data block belongs to a packet data frame or not;

for each said data block, removing said appended extra bit; and for each of a plurality of data blocks having a bit designating said data block belongs to a packet data frame, assembling said data blocks into a said data frame.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 15 illustrates schematically an example of a COBS byte encoding scheme, as applied in the third specific implementation of the present invention.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 2:
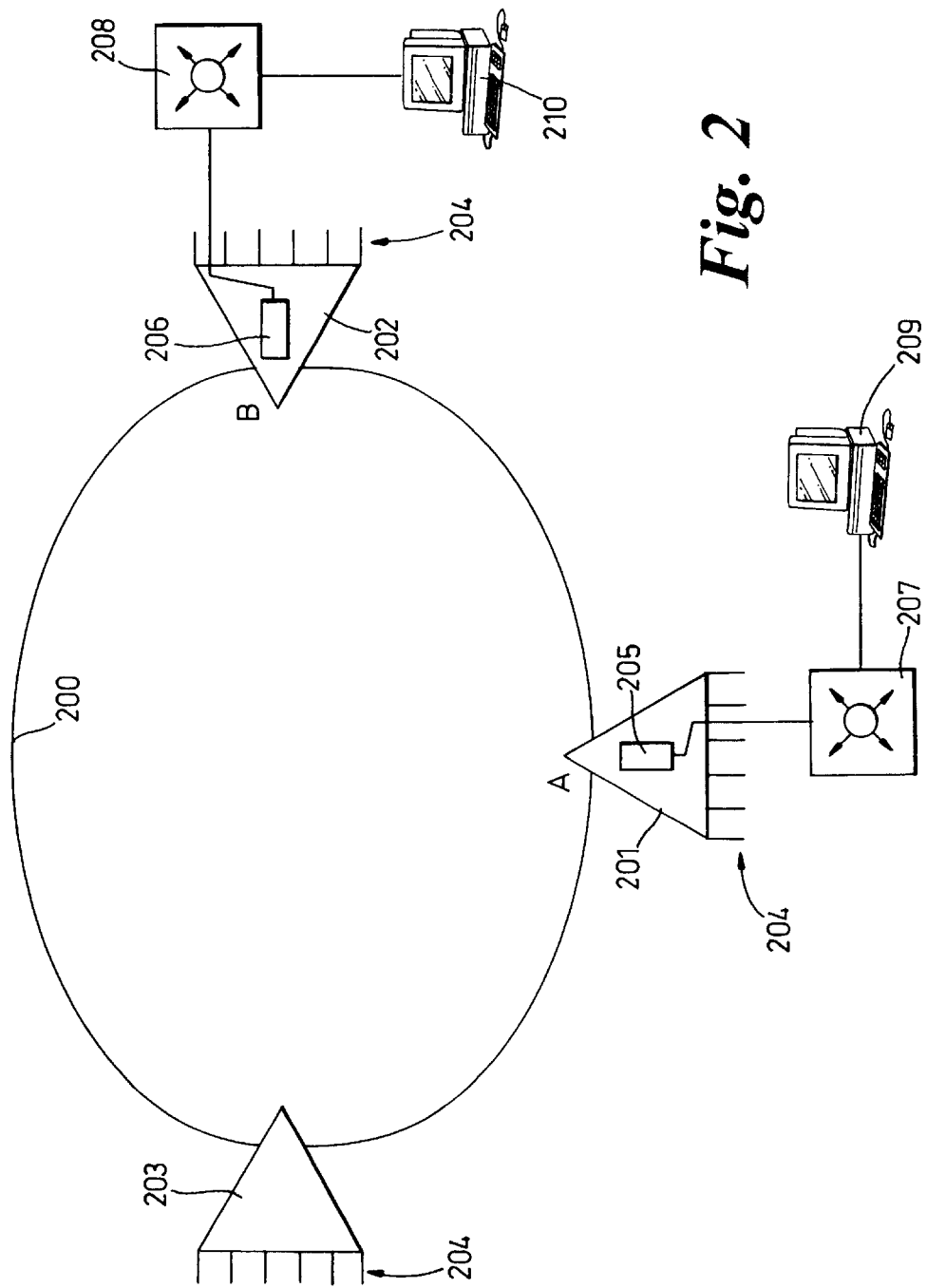
FIG. 2 illustrates schematically a digital synchronous ring capable of carrying frame based data according to a first specific embodiment of the present invention.

Referring to FIG. 2 herein, there is illustrated schematically a section of a synchronous digital hierarchy (SDH) network comprising an STM-fiber ring 200 connecting a plurality of add-drop multiplexers 201–203, each multiplexer having a plurality of telecoms tributaries 204, for example E1 tributaries operating at 2 MBits/s, first and second multiplexers 201, 202 respectively at first and second locations A, B, each comprise a corresponding respective Ethernet port card 205, 206; first and second Ethernet routers 207, 208 connected to respective first and second Ethernet port cards 205, 206 of the first and second multiplexers; and communicating with the Ethernet routers, are a plurality of computing devices, for example personal computers, mini computers etc, 209, 210.

Figure 1:
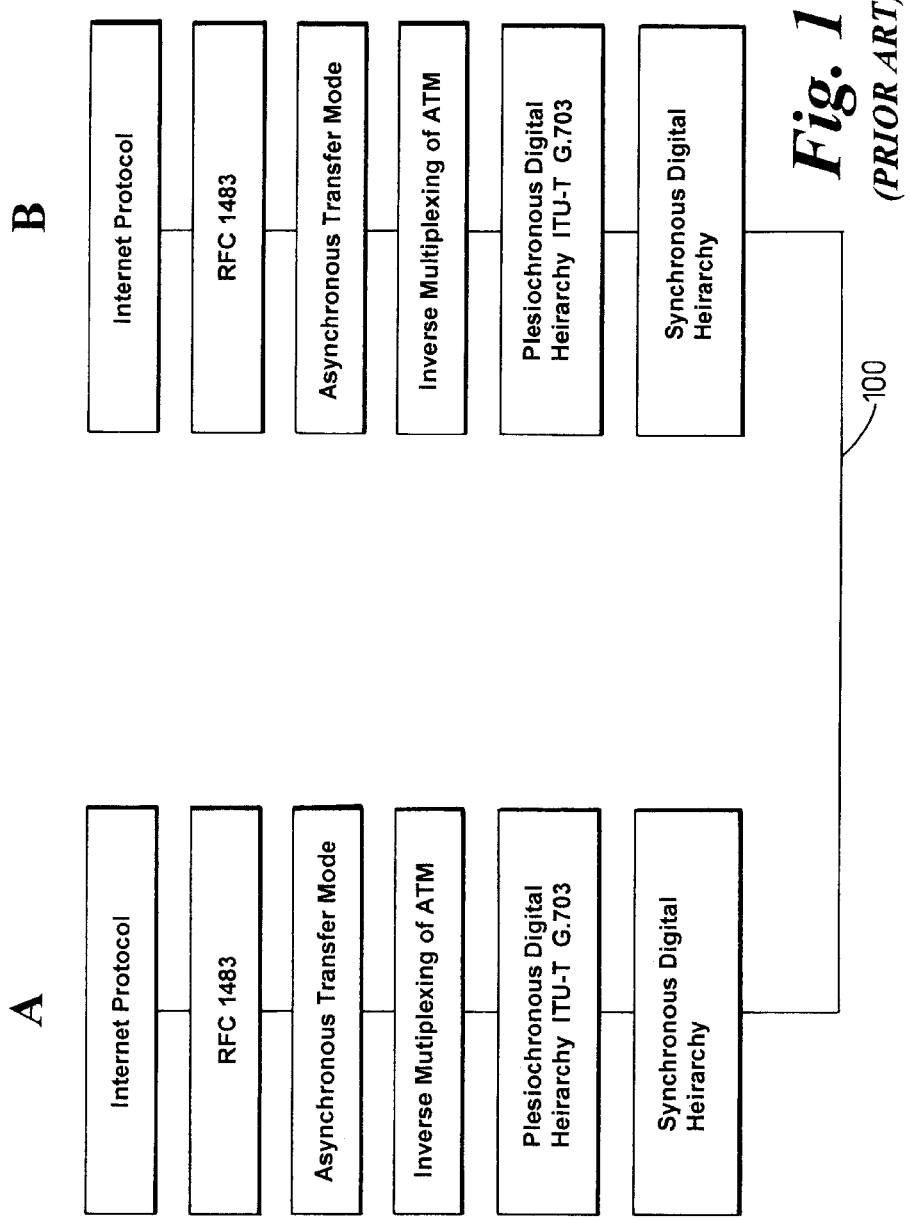
FIG. 1 herein illustrates schematically a prior art inverse multiplexing of asynchronous transfer mode (IMA) encoding scheme for carrying packetized data over a synchronous digital network.

The embodiment of FIG. 2 herein illustrates schematically an Ethernet channel carried over a synchronous digital hierarchy ITU-T recommendation G.701 type network between first and second locations A, B. First and second Ethernet routers and first and second synchronous multiplexers may be located at, for example, a pair of geographically separated customer premises, thereby providing an Ethernet data channel over a relatively wide area. The embodiment of FIG. 1 may provide what has historically in the prior art been regarded as local area network functionality, ie Ethernet data rates and Ethernet reliability, but over what has historically been considered geographical coverage of a wide area network, ie over a range of from the order of a few kilometers to thousands of kilometers. The add-drop multiplexers of FIG. 1 are illustrative of transport of Ethernet packetized data directly over a synchronous digital hierarchy network. Ethernet frame based data is incorporated into synchronous virtual containers by the Ethernet port cards of the synchronous multiplexers. The Ethernet port cards is are not restricted to add-drop multiplexers, but may be incorporated in any synchronous digital multiplexer, for example an SDH terminal multiplexer.

Whilst the specific embodiment herein illustrates an Ethernet over synchronous digital hierarchy implementation, in general, the invention is not limited to an Ethernet implementation but encompasses any frame based data protocol. Examples of frame based data protocols include IEEE standard 802.3 frame based data carrier systems, Ethernet IEEE 802.1 systems, OSI layer 2 frame based data carrier systems in general, conventional token ring systems, conventional token bus systems, fiber distributed data interface (FDDI) systems, and dual queue dual bus (DQDB) systems. Similarly, the term synchronous digital hierarchy encompasses the known North American Synchronous Optical Network (SONET) based systems.

The term "packet" as used herein includes but is not restricted to bit and byte sequences of indeterminate length, and includes cells. The term synchronous digital network and synchronous digital channel includes plesiochronous networks and channels carried over synchronous networks.

Hereinafter, specific embodiments and methods according to the present invention will be described in relation to the Ethernet system, being representative of OSI layer 2 frame based data systems, and being the actual best mode contemplated by the inventors.

Figure 3:
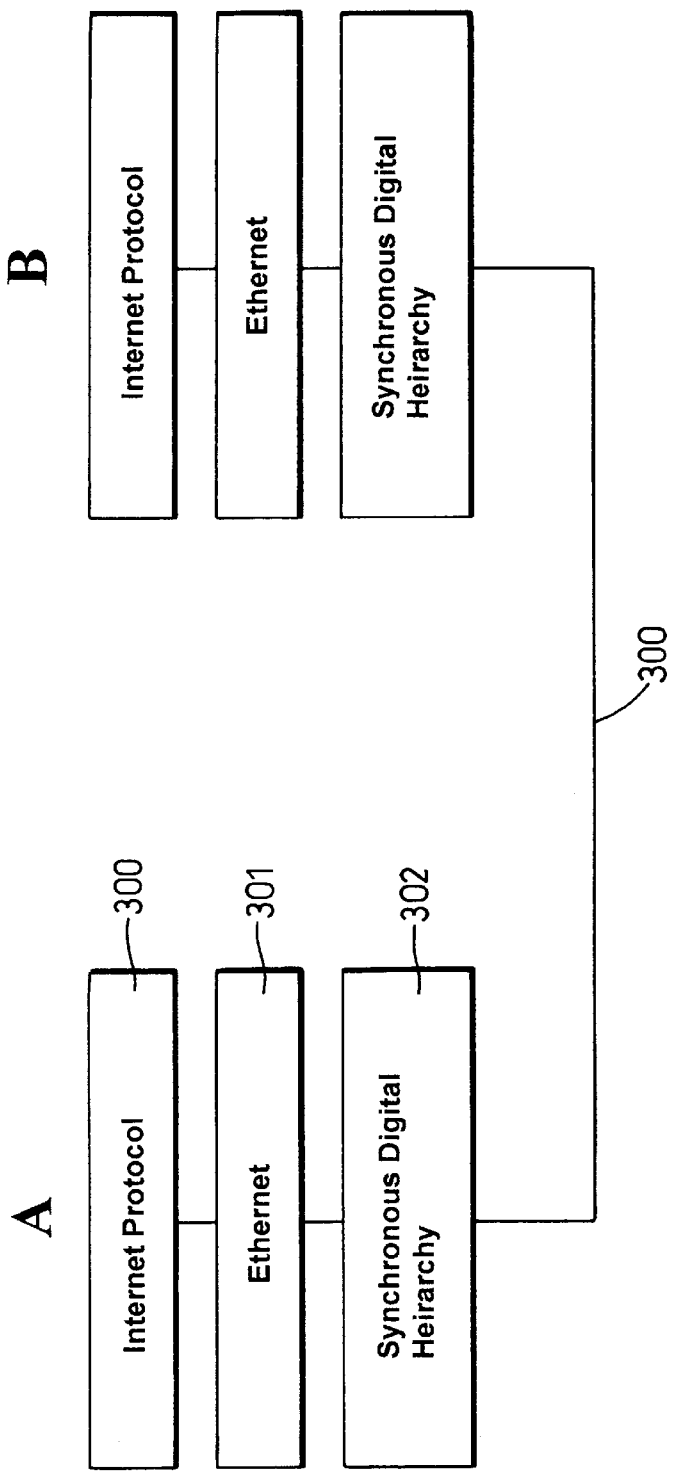
FIG. 3 illustrates schematically a protocol stack implemented in the embodiment of FIG. 2.

Referring to FIG. 3 herein, there is illustrated schematically protocol stacks operating within the computing devices 209, 210, first and second Ethernet routers 207, 208, first and second Ethernet port cards 205, 206 and first and second multiplexers 201, 202 at first and second locations A, B.

Internet protocol packets in Internet protocol layer 300 are entered into Ethernet data frames in Ethernet layer 301, as is conventionally known in the art.

Ethernet carried IP packets are incorporated into SDH virtual containers in SDH protocol layer 302.

By incorporating Ethernet directly into synchronous digital hierarchy ITU-T recommendation G.701 channels, the high data rates available using Ethernet can be provided in a geographically widespread system, which is unlimited by the conventional distance limitations imposed on prior art Ethernet local area network systems. Further, traffic can be switched at line speeds, rather than incurring an encapsulation delay as in the prior art intermediate multiplexing of ATM system.

Compared to the prior art IMA system, specific implementations according to the present invention may have an advantage on line speed alone, of the order of 20% lower delay. However, additionally, the prior art IMA system has a greater number of layers of protocol, each of which adds a significant delay to traffic data, compared to the specific implementations of the present invention.

In the present disclosure, since the SDH virtual container payload data rates are relatively flexible compared to conventional telecoms interface data rates, a more efficient match between Ethernet frame based data, operating at Ethernet data rates, and telecoms data rates in the synchronous domain can be achieved compared with prior art solutions which match Ethernet data with telecoms E1, E3, STM-1 and STM-4 data rates. Prior art telecoms interfaces which can be purchased for carrying frame based data over a wide area network operate at 2 MBits/s (E1), 34 MBits/s (E3), 155 MBits/s (STM-1) or 622 MBits/s (STM4). These data rates are not well matched to the prior art Ethernet data rates of 10 MBits/s, 100 MBits/s and 1 GBits/s. Table 1 herein illustrates a comparison of Ethernet data rates (in a central column of Table 1) with telecoms interface rates (in the left hand column of FIG. 1) of the prior art solutions, and SDH virtual container rates (in the right hand column of Table 1) of the present disclosure. On the other hand, the prior art Ethernet data rates are well matched to integer multiples of the synchronous digital hierarchy virtual container payload data rates, as illustrated in Table 1. The SDH payload data rates have a granularity of a minimum incremental step of 2 MBits/s. A minimum granularity of Ethernet rates is 10 MBits/s, and so 5 SDH VC12 containers can accommodate neatly a single 10 MBits/s Ethernet channel. For example, in the presently disclosed implementation, a 10 MBits/s Ethernet data rate can be accommodated neatly into 5 VC12 containers, each of 2 MBits/s. A 100 MBits/s Ethernet data rate can be accommodated in 2 VC3 containers, each of 50 MBits/s.

TABLE 1

| Telecoms | Ethernet | Synchronous Network |
| --- | --- | --- |
| E1 (2 Mbits/s) | 10 MBits/s | 1-5xVC12 (2 MBits/s–10 MBits/s) |
| E3 (34 MBits/s) | 100 MBits/s | 1-2xVC3 (50 MBits/s–100 MBits/s) |
| STM-1 (155 MBits/s) | 100 MBits/s | 1-2xVC3 (50 MBits/s–100 MBits/s) |
| STM-4 (622 MBits/s) | 1 GBits/s | VC4-Nc (155 MBits/s–1.2 GigaBits/s) N = 1–8 |

A further feature of the specific embodiments and methods described herein is the provision of quality of service. By using the Ethernet IEEE 802.1 PQ priority field, different packets can be given different priorities for transmission. Thus, quality of service levels which are achievable in prior art local area networks, may be extended over greater geographical distances carried over a synchronous digital hierarchy transport network as provided by the specific embodiments and methods of the present invention.

Figure 4:
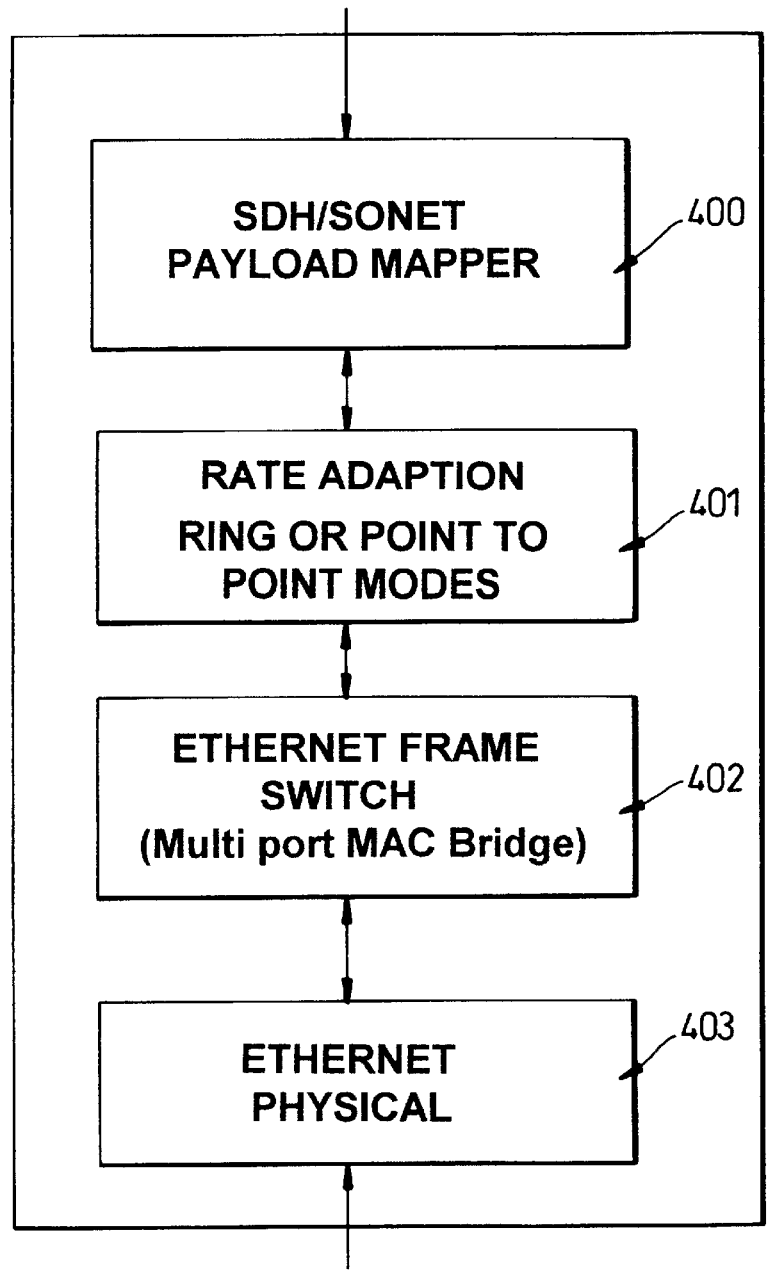
FIG. 4 illustrates schematically an Ethernet port card component of a synchronous digital multiplexer according to a second specific embodiment of the present invention.

Referring to FIG. 4 herein, there is illustrated schematically components of an Ethernet port card comprising a synchronous digital multiplexer. The Ethernet port card is incorporated into a synchronous digital hierarchy multiplexer (or a SONET multiplexer), so that as well as having a plurality of tributary interfaces for telecoms channels, for example E1, T1, STM-1, the multiplexer also has an interface for frame based data systems, eg Ethernet, as illustrated in FIG. 2 herein.

The Ethernet port card of FIG. 4 herein comprises a conventional Ethernet physical port 403, the Ethernet physical port communicating with an Ethernet frame switch 402 which may comprise a conventional frame switch, such as available from Plaintree, MMC, or TI; a rate adaption means 401 for adapting between Ethernet rates and SDH rates equivalent to the rates of the virtual containers; and an SDH payload mapper 400 for mapping Ethernet frames into one or more SDH payloads. Rate adaption means 401 and SDH payload mapper 400 may be implemented as a field programmable gate array (FPGA) or an application specific integrated circuit (ASIC).

Rate adaption means 401 comprises a first plurality of Ethernet ports operating at 10 MBits/s and 100 MBits/s in accordance with IEEE standard 802.3; and a second plurality of synchronous ports operating at 2 MBits/s, 50 MBits/s and 100 MBits/s communicating with SDH payload mapper 400. Rate adaption means 401 comprises a plurality of through channels for adapting IEEE standard 802.3 data frames into bitstreams having data rates of 2 MBits/s, 50 MBits/s and 100 MBits/s. Rate adaption means 401 comprises a plurality of multiple channels each adapting an IEEE standard 802.3 rate data frame channel to a 2 MBits/s, 50 MBits/s or 100 MBits/s bitstream channel.

In a further embodiment, rate adaption means 401 may be replaced by prior art commercially available POS phy chips available from PMC Sierra.

SDH payload mapper 400 maps Ethernet data frames directly into SDH data frames, and operates a form of mapping which does not increase the size of the Ethernet frames.

Further details of construction and operation of payload mapper 400 will now be described.

Figure 5:
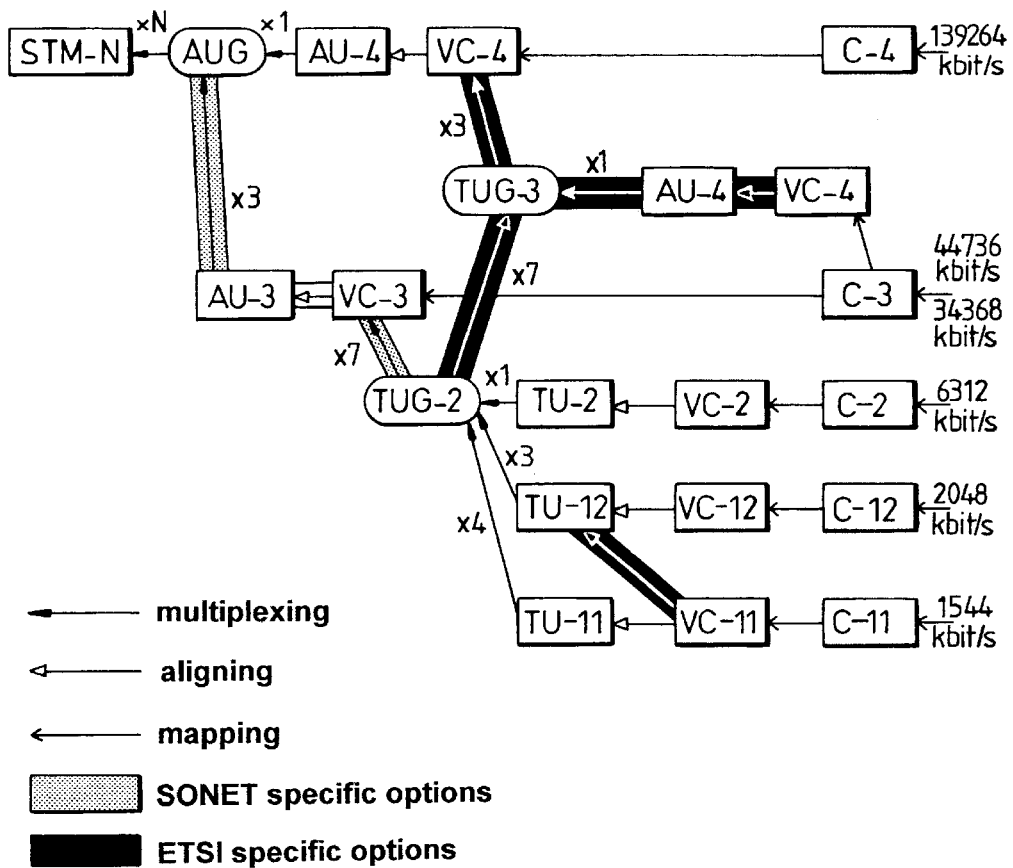
FIG. 5 illustrates schematically a synchronous digital hierarchy multiplexing structure as is known in the prior art.
Figure 6:
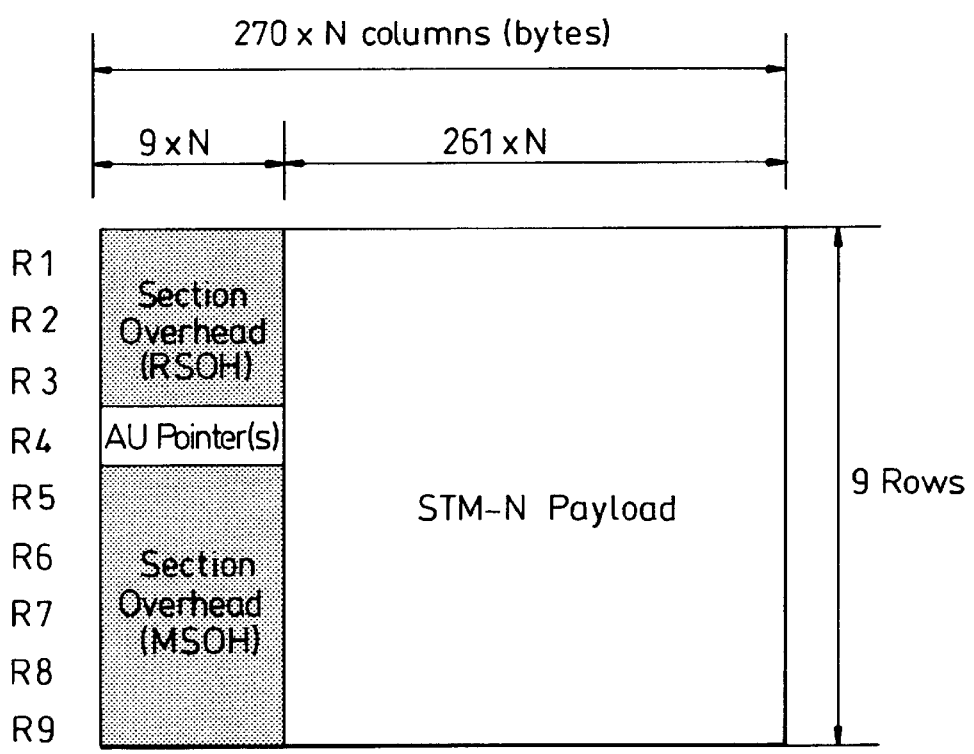
FIG. 6 illustrates schematically a prior art synchronous digital hierarchy STM-N data frame as is known in the prior art.

Fundamentally, prior art SDH multiplexers operate to time division multiplex bit oriented data. A plurality of lower data rate telecoms tributaries are multiplexed into a set of virtual containers operating at higher data rates. The SDH multiplexing structure according to ITU-T recommendation G.70X is illustrated schematically in FIG. 5 herein. A set of STM frames are assembled to contain a plurality of virtual containers which are carried as an STM-N payload as illustrated in FIG. 6 herein. On the other hand, conventional prior art datacoms routers and equipment are frame oriented devices which operate on packets of data. The Ethernet port card of FIG. 4 herein adapts the Ethernet data frames to a data rate which matches a data rate which can be multiplexed into a virtual container, and maps each Ethernet data frame into one or more SDH virtual containers directly and without any further encapsulation in intermediate protocols.

For example, a 10 MBits/s Ethernet channel may be mapped onto 5 VC12 containers, each VC12 container having a rate of 2.048 MBits/s. The 5 VC12 containers are concatenated together to carry the 10 MBits/s Ethernet channel.

For entry of a 100 MBits/s Ethernet channel into the synchronous network, a single 100 MBits/s Ethernet channel may be mapped into 2 concatenated VC3 containers each having a capacity of 51.84 MBits/s. To carry an Ethernet 1 GBits/s channel over a synchronous network, the Ethernet channel is mapped into 7 VC4 containers, each having a capacity of 139 MBits/s.

SDH payload mapper 400 communicates with the plurality of bitstream channels of rate adaption means 401. SDH payload mapper maps the plurality of bitstream channels of rate adaption means 401 into a plurality of SDH payloads, for example VC3, VC4 or VC12 thereby accessing the synchronous digital hierarchy network.

Figure 7:
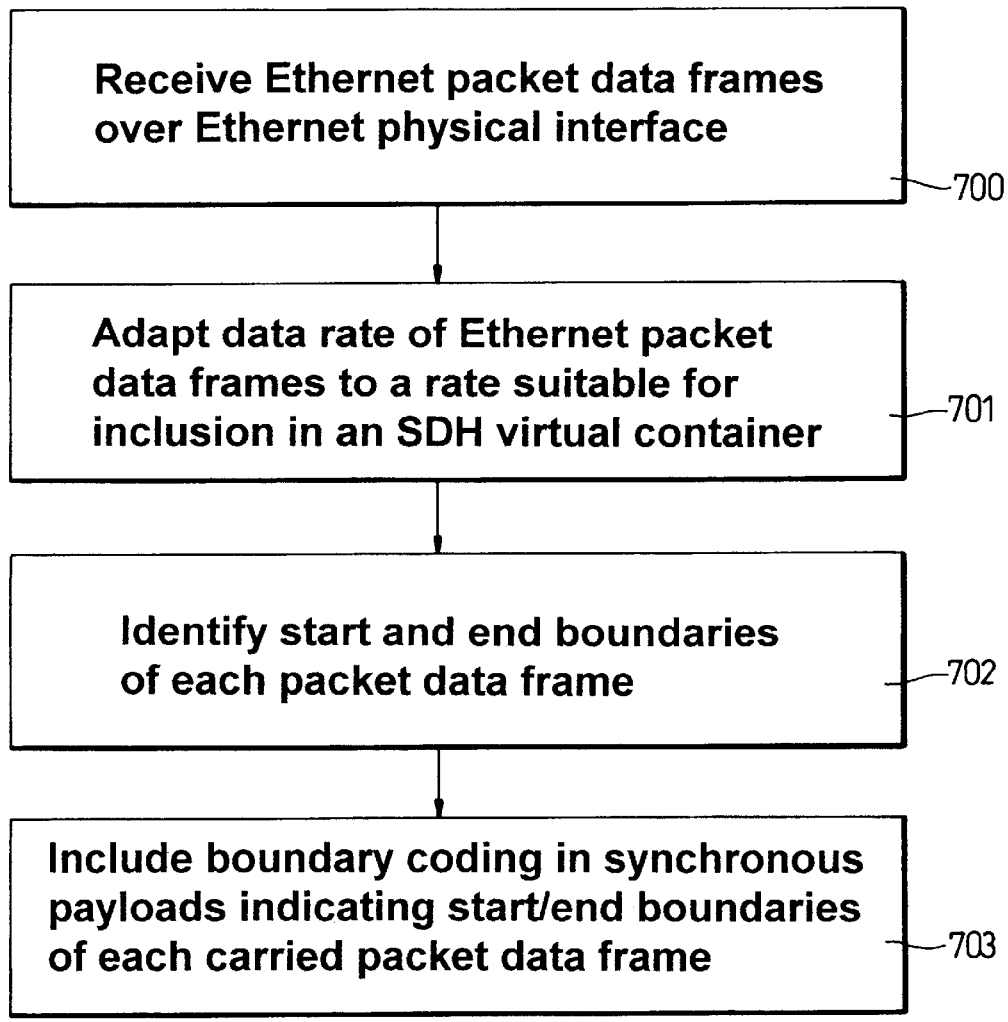
FIG. 7 illustrates schematically a send operation of a synchronous payload mapper component of an Ethernet port card.

Referring to FIG. 7 herein, operation of SDH/SONET mapper in a send mode is schematically illustrated. In step 700, Ethernet packet data frames are received over the Ethernet physical interface 403, which are then adapted in rate to a data rate suitable for inclusion into SDH/SONET virtual containers in step 701 by rate adaption means 401. SDH/SONET payload mapper 400 identifies a start and end of each packet data frame as it is received in step 702, and encodes the data frames with boundary markers or pointers, prior to their inclusion into at least one virtual container in step 703.

Figure 8:
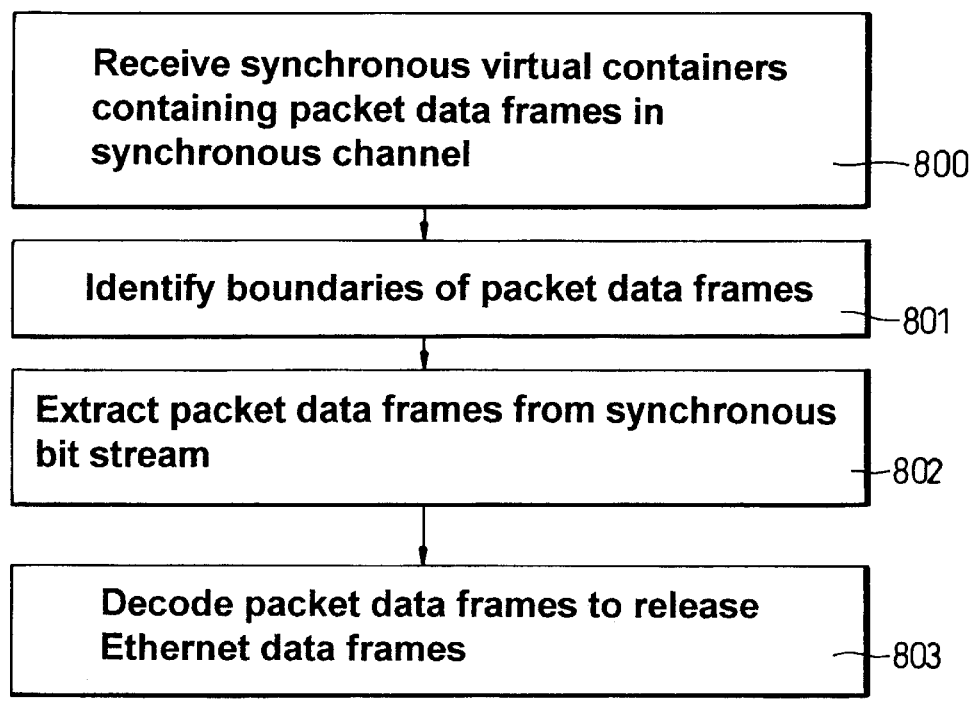
FIG. 8 illustrates schematically a receive operation of a payload mapper of the Ethernet port card component.

Referring to FIG. 8, there is illustrated schematically a receive mode of SDH/SONET payload mapper 400. In step 800, the mapper receives a continuous bistream from a plurality of demultiplexed synchronous virtual containers, containing encoded packet data frames in a synchronous channel, which have their boundaries marked by start of data frame and end of data frame markers. The markers can include an encoding as part of the data frame bitstream, or can include pointers contained in the virtual container payloads. In step 801, the mapper identifies the start and end boundaries of each data frame from the boundary encoding, or from the pointers, and in step 802 having identified the start and end of the packet data frames extracts those data frames from the synchronous bitstream. The packet data frames are decoded in step 803 in order to reconstitute the transported packet data frames.

Two problems can occur in mapping the Ethernet data frames into SDH frame payloads:

Firstly, the Ethernet physical layer detects the start and end of Ethernet frames by the presence of encoded data (usually Manchester encoded data) on the physical media. This is not possible for switches and MACs, so when an Ethernet frame is transported over synchronous digital hierarchy in virtual containers, somehow the information that the content of the virtual containers is an Ethernet data frame needs to be provided, as distinct from a null or fill data. The conventional Ethernet preamble identifying the start and end of Ethernet data frames cannot be used, because the SDH layer will not recognize the Ethernet preamble as distinct from a case where user data happens to have the same byte sequences as the Ethernet preamble.

Secondly, in solving the first problem above using an encoding scheme to replace the Ethernet preamble and to identify the Ethernet data frame in the SDH frame payload can lead to expansion of the Ethernet data frame. However, the avoid delays, and to maintain efficient use of capacity, it is preferred that the Ethernet data frame maintains either its original size, or a predetermined size within the SDH frame payload.

Increasing the size of the Ethernet frame is a disadvantage, because it reduces the efficiency of packing the Ethernet frames into the SDH frames. Secondly and more importantly, Ethernet devices are prone to generating Ethernet frames at a relatively constant rate, without there being an ability to slow down or speed up the rate at which the frames are generated, or to enforce spaces between the frames. Therefore, a form of mapping which does not result in packet expansion and which avoids breaking the gap between Ethernet frames, is ideally required.

The inventors have identified four mapping schemes which may be used:

In a first specific implementation, there is provided a segmentation and reassembly scheme running over the payload of virtual container frames. A potential problem with this approach is that it is necessary to create virtual containers on a 125 µs or 500 µs cycle. However, an Ethernet frame may be ready to transmit at any time during a virtual container frame, therefore the Ethernet frame may need to be delayed for a maximum of 125 µs before entering into the next VC frame. Whilst a simple segmentation scheme is feasible, it could introduce a serial delay in data transfer from an Ethernet frame to a virtual container frame of multiples of 125 µs.

Secondly, a pointer based scheme may be used for transferring Ethernet data frames to virtual container frames. A first pointer is provided in a known location of a VC payload, which points to the start of an Ethernet data frame. Another pointer, or a length field, points to the end of the Ethernet data frame. Ethernet frames may start and end inside one payload frame. However, in this approach a potential problem is that multiple Ethernet frames may be fitted inside a VC-3 payload, or for example a pair of minimum Ethernet frames may fit into a single VC-12 multiframe, so the number of pointers could be large and incur added complexity. Since the pointer value cannot be filled in until an Ethernet frame begins to transfer to the VC payload, in order to avoid delay, pointers must be provided at the end of the VC frame, and point backwards to Ethernet frames is contained within the VC frame. This then incurs delay and storage at the destination whilst waiting for the pointer to arrive (the Ethernet data frame cannot be processed until the complete VC frame has been received.

Figure 9:
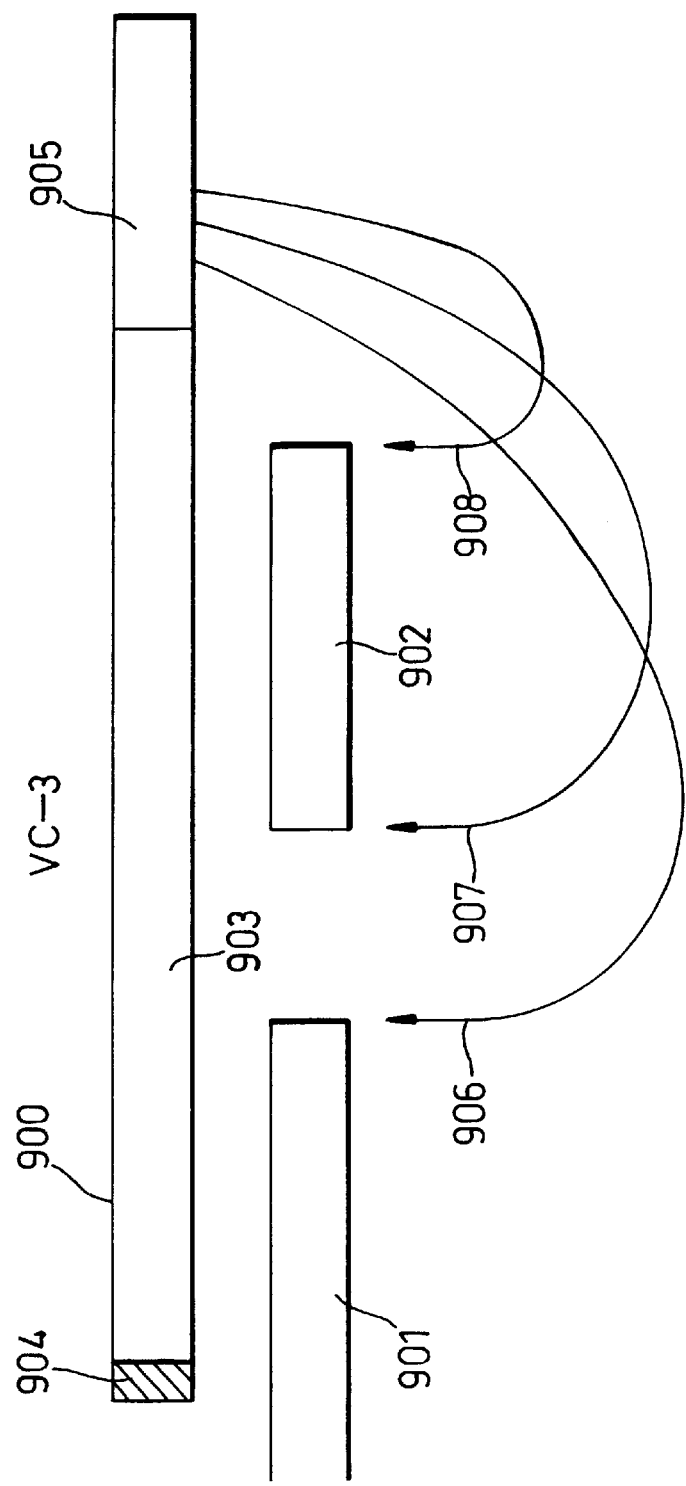
FIG. 9 illustrates schematically a method of incorporating Ethernet frame based data into a synchronous digital payload using a pointer method according to a first specific implementation of the present invention.

Referring to FIG. 9 herein there is illustrated a second specific implementation according to the present invention using a pointer based scheme in which a single VC3 payload 900 comprises a plurality of Ethernet data frames 901, 902 which are identified by means of pointers. The VC3 payload 903 into which the Ethernet data frames are inserted comprises 955 data traffic bytes, plus a single byte frame identification 904 and 36 bytes of pointers 905 which point to the positions of the starts and ends of one or a plurality of Ethernet data frames within the user data portion 903. 18 pointers each of 16 bits are provided at the end of the VC3 payload after the user data portion 903. Each pointer has the form:

$$fbxxnnpppppppppp$$

where the bits fb denote whether the pointer points to a start or finish position of the Ethernet data frame, or whether the pointer is unused; xx is a spare bit, nn denotes which of a plurality of virtual containers a first or last byte of the Ethernet data frame is in, and the string of bits p denote the position of the start or finish within the VC3 user data portion 903.

In the example of FIG. 9, first pointer 906 points to an end of first Ethernet data frame 901, second pointer 907 points to a start of a second Ethernet data frame 902 and third pointer 908 points to an end of the second Ethernet data frame 902. A minimum size of Ethernet data frame of 64 bytes may be incorporated and a minimum gap between Ethernet data frames of 120 bytes may be accommodated, at 100 MBits/s.

Since a SONET or SDH frame has a constant time duration of 125 µs, as the data rate of Ethernet frames increases, the greater of number of bytes per SONET or SDH frame, and the greater the number of Ethernet packets per SDH/SONET frame. As the data rate increases and the number of packets increase, then the number of pointers contained in the SDH/SONET frame must increase. By including the pointers in a VC-3 or other virtual container, the system shown in FIG. 9 is scaleable with data rate, the number of pointers increasing as the data rate increases.

In a third specific implementation, a bit stuffing scheme may be employed to designate the start and ends of Ethernet data frames in virtual containers. In such a bit stuffing scheme, the intent is to be able to recognize a string of ones or zeros as an interval between Ethernet data frames within the virtual container. This is achieved by ensuring that the string of ones or zeros denoting the interval does not occur as part of the Ethernet data in the date frame. In bit stuffing schemes, a framing protocol software transforms any Ethernet data it is given into a form that does not contain reserved character values denoting start or end of Ethernet data frames. This leaves predetermined bit sequences, eg a string of ones or a string of zeros available to unambiguously designate a start or end of an Ethernet data frame. A known bit stuffing algorithm is the prior art HDLC (BCMA 40) system in which a binary sequence 01111110 called a "flag sequence" is used to mark boundaries between packets. To eliminate this data pattern from the user data contained in the Ethernet data frames, the transmitter, whenever it observes five ones in a row in the Ethernet data frame, inserts a zero immediately following the string of five ones. This eliminates the possibility of six ones ever occurring inadvertently in the data and therefore eliminates the sequence 0111110 ever occurring in the user data. The receiver performs the reverse process: after observing five ones in a row, if the next binary digit is a zero the receive algorithm deletes the next binary digit, and if it is a one, then the receive algorithm recognizes it as one of the special framing patterns. However, there is a problem with this scheme in that the HDLC scheme for inserting extra zeros (bit stuffing) increases the size of the transmitted packet. In the HDLC bit stuffing scheme, packet expansion of the order of 20% may occur. In a second version of HDLC, byte stuffing is used. HDLC byte stuffing may be well suited to a SONET system since SONET is a byte oriented synchronous scheme. However, in the HDLC byte stuffing system, statistically, since the forbidden string 7E occurs only one in every 255 bytes, the average packet extension should be of the order of 0.4%. However, in a worst case, for data that consists entirely of binary ones, HDLC framing can add up to 50% to the transmitted size of the data. Since in the worst case 50% extra data is transmitted, this can incur a maximum 50% additional delay due to HDLC framing. Thus, using the HDLC system, variable delays may occur and in the worst case, a 50% extra delay may be incurred in sending and Ethernet data frame within a VC payload. Further, the size by which the Ethernet data frame expands due to HDLC bit or byte stuffing is not fixed, but depends upon the data content of the Ethernet frame.

Bit stuffing schemes appear less efficient in use of frame capacity than pointer or segmentation type schemes as mentioned above. However, pointers and segmentation schemes carry a penalty in bytes used, and incur delay due to waiting for receipt of the pointers before decoding the Ethernet data frames. With bit stuffing schemes, both transmission and reception can occur as soon as a first data byte arrives at a transmitting or receiving entity. Delay is minimized.

In a fourth specific implementation and subject of the best mode herein, a nine bit encoding scheme may be used to map the Ethernet data frames into synchronous digital frame payloads. For every 8 bits of Ethernet data frame which are transmitted, 9 bits of SDH payload are occupied. An extra bit accompanies every byte of user data. The extra bit is used to determine whether the accompanying byte of data belongs to an Ethernet data frame.

An advantage of this scheme is that a known and constant frame data transfer rate is achieved between the Ethernet data frames and the SONET payloads. Further, the scheme is relatively simple to implement by algorithm, incurring low delays due to operation of the encoding algorithm used to implement the encoding scheme.

Figure 10:
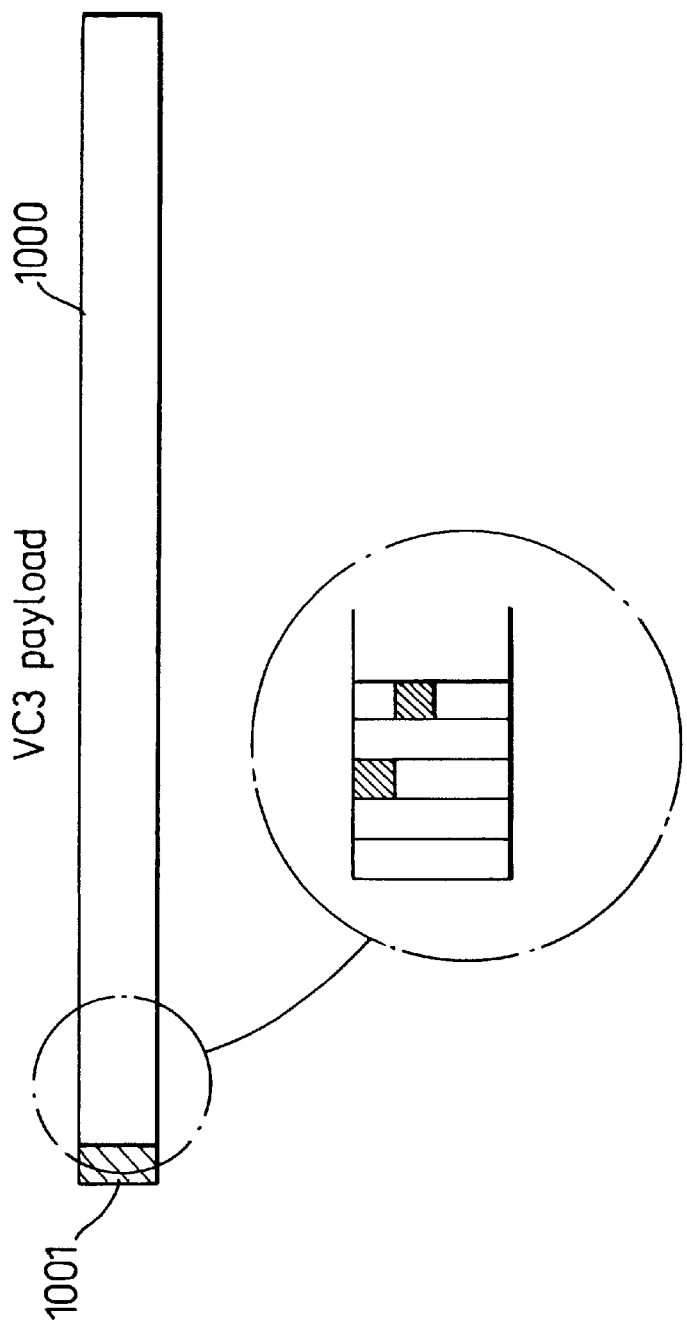
FIG. 10 illustrates schematically a method of incorporating frame based data into a synchronous digital payload using a 9 bit stuffing scheme according to a second specific implementation of the present invention.

Referring to FIG. 10 herein, there is shown a single VC3 payload 1000 commencing with a first byte 1001 used for identification of an Ethernet data frame. Successive bytes of data in the VC3 payload are filled with Ethernet data frame data. Each byte of data is followed by a ninth bit, counting from the end of the first Ethernet frame identification byte 1001. The ninth bit is set to 1 when the data is part of an Ethernet data frame. For a byte of data which is not part of an Ethernet data frame, a '0' is appended to the end of the data byte. At an end of an Ethernet data frame, for the last byte a '1' bit is appended, and a next byte, not being part of an Ethernet data frame, a '0' is appended.

A resultant example data rate achieved with a nine bit stuffing scheme may be as follows: a VC3 payload comprises 6040 bits, occupying a duration of 125 $\mu$s. Dividing 6040 into a plurality of 9 bit sections gives 671 units, each of 9 bits, over the 125 $\mu$s payload duration. This gives an Ethernet frame data rate of 671 bytes in 125 $\mu$s, which is equivalent to 42.951 MBits/s. In other words, four 10 MBits/s data frames may fit neatly into a single VC3 container. Interleaving an Ethernet frame between two VC3 frames gives an Ethernet frame data rate of 85.9 MBits/s.

Figure 11:
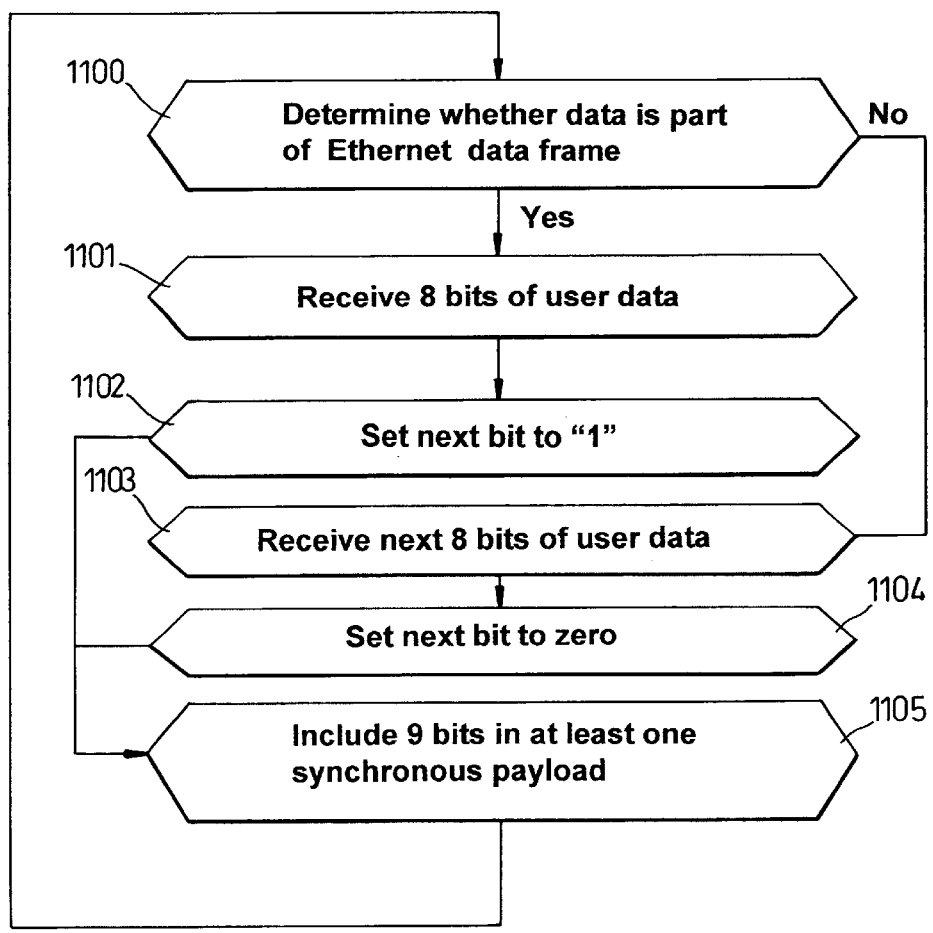
FIG. 11 herein illustrates schematically steps applied for bit stuffing of a synchronous digital payload according to the second specific implementation herein.

Referring to FIG. 11 herein, an algorithm for incorporating Ethernet data is frames into a VC3 payload using a 9 bit stuffing method is illustrated schematically. In step 1100 it is determined whether the user data comprises a frame of Ethernet data, depending on whether an Ethernet identification frame has been received or not. If the received data does comprise an Ethernet data frame, in step 1101 a next 8 bits of data is received, and in step 1102 the next successive bit is set to 1. In step 1105, the 8 bits of user data plus the extra ninth bit set to "1" is incorporated into the VC3 synchronous payload. The algorithm then repeats steps 1100, 1101, 1102, 1105 for the next 8 bits of user data, adding a further "1" bit to the end of the next 8 bits, and so on. If in step 1100, data indicating an end of an Ethernet data frame has been received, a next 8 bits of user data which are not part of the Ethernet frame are received in step 1103, and a zero bit is appended to the next 8 bits of data in step 1104. The ninth bit designated as zero indicates the end of the Ethernet data frame within the VC3 container has occurred.

Figure 12:
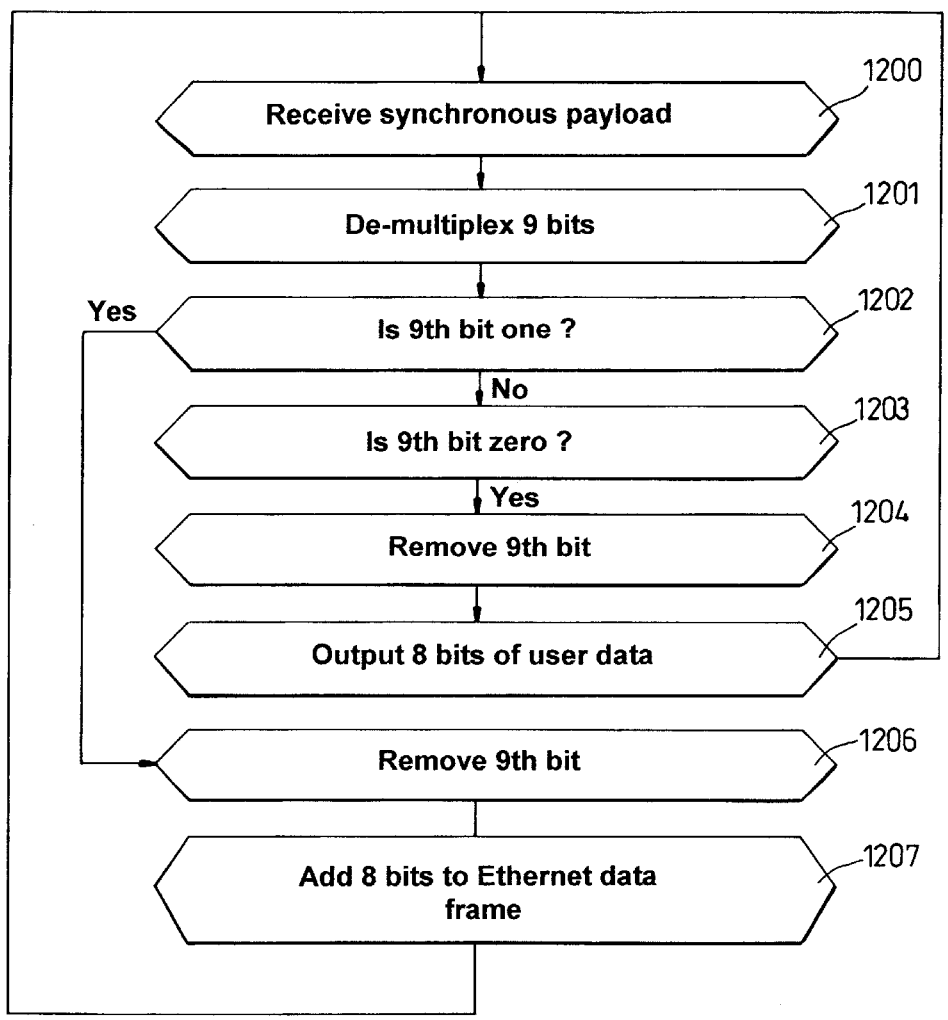
FIG. 12 illustrates schematically steps for decoding of 9 bit stuffed synchronous digital payloads according to the second specific implementation herein.

Referring to FIG. 12 herein, there is illustrated schematically an algorithm for unpacking 9 bit stuffed VC3 payload data. In step 1200, the synchronous payload is received. 9 bits of data at a time are buffered in step 1201, and in step 1202 the ninth bit of each 9 bit portion is checked and determined whether the bit value is "1". If the ninth bit value is "1", in step 1206, the ninth bit is removed, and in step 1207 a byte of data is added to a stored Ethernet data frame. If in step 1202 the ninth bit is not a "1", but is determined to be a zero in step 1203, the ninth bit (value zero) is removed in step 1204 and 8 bits of user data are output in step 1005 not as part of an Ethernet data frame. In each case the next 9 bits of data are input into the buffer and the algorithm of FIG. 12 repeats in a real time continuous mode receiving and unpacking 9 bit encoded data from the VC3 payload.

Figure 13:
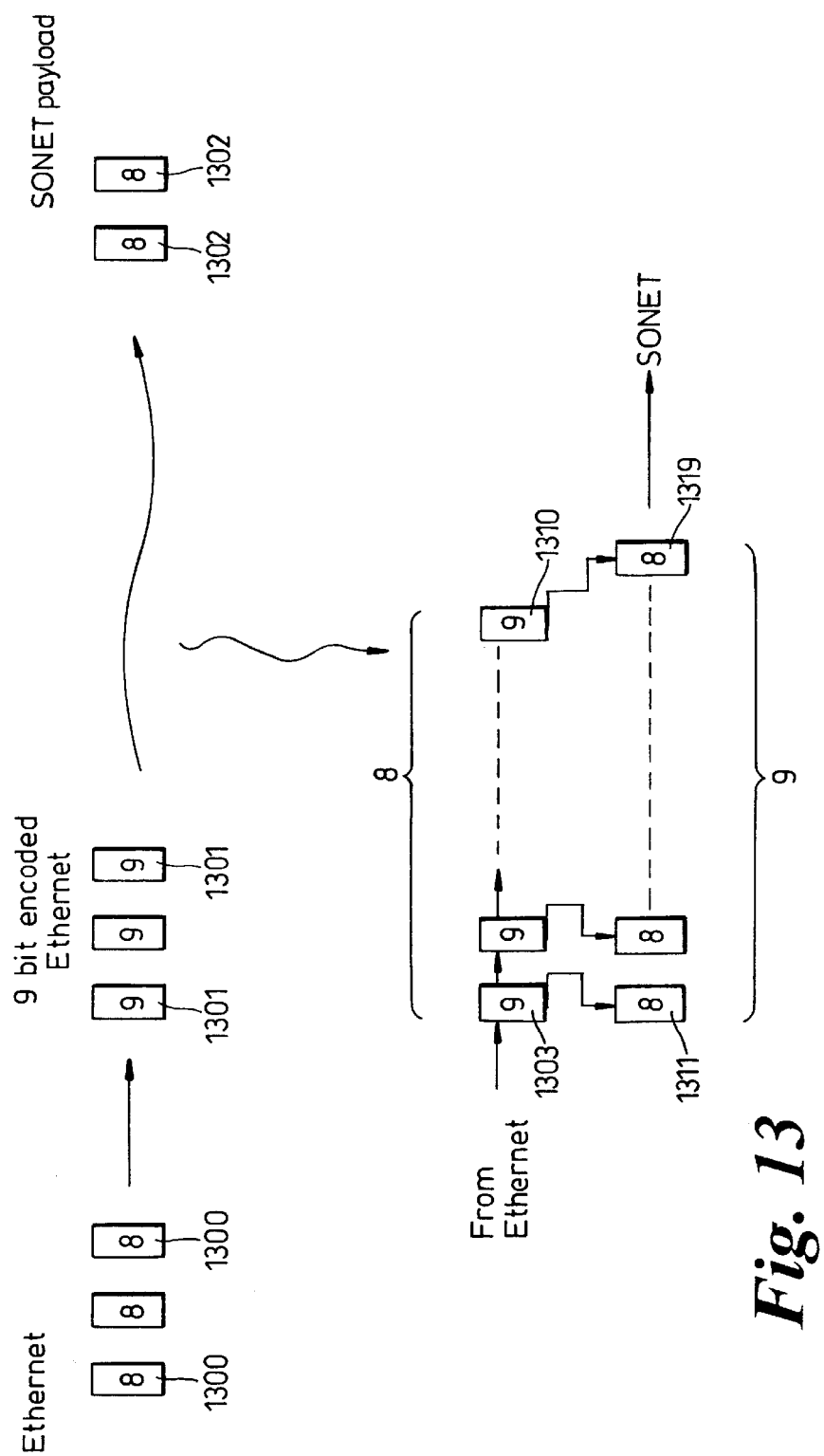
FIG. 13 herein illustrates schematically a shift register arrangement for implementing inclusion of 9 bit encoded Ethernet data frames into a synchronous digital payload.

Referring to FIG. 13 herein, there is illustrated schematically a hardware implementation for converting a plurality of serially received 9 bit encoded data blocks into a plurality of 8 bit bytes suitable for packing into an SDH payload. A plurality of 8 bit bytes 1300 of an Ethernet data frame are converted into a plurality of 9 bit encoded data blocks as described with reference to FIG. 11 herein. There is then the problem of how to convert the data blocks of 9 bit encoded Ethernet data frame data into 8 bit data blocks (conventional bytes) for transport in the SDH payload. In the best mode herein this may be achieved by providing a plurality of 9 bit shift registers 1303–1310 which receive 9 bit encoded data blocks, each of 9 bits size, which output into a plurality of 8 bit shift registers 1311–1319, which feed directly into an SDH payload. Eight 9 bit shift registers 1303–1310 output into nine 8 bit shift registers 1311–1319. 72 bits of 9 bit encoded Ethernet frame data is input into the 8 bit array of 9 bit wide shift registers 1303–1310. When these shift registers are full with 72 bits of 9 bit encoded data, the entire array of eight 9 bit shift registers is transferred into the array of nine 8 bit shift registers 1311–1319. The array of nine 8 bit shift registers is then unloaded into an SDH payload serially.

In a fifth specific implementation according to the present invention, an encoding scheme known as Consistent Overhead Byte Stuffing (COBS) may be applied to map Ethernet frames into an SDH payload. The COBS technique is a known prior art technique published by Stuart Cheshire and Mary Baker, of the Computer Science Department, Stanford University, Stanford, Calif., USA in 1997 by the Association for Computing Machinery.

Figure 14:
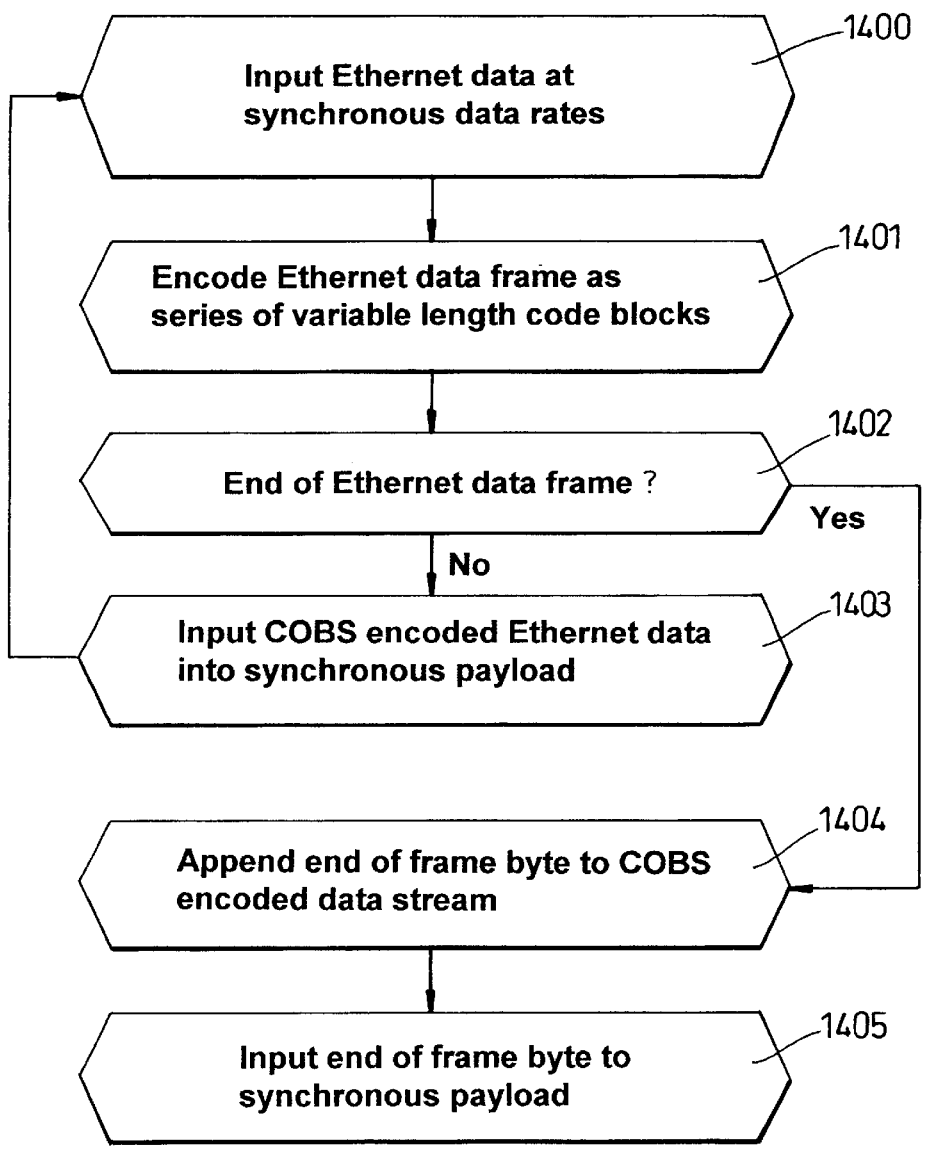
FIG. 14 illustrates schematically steps for encoding Ethernet frame base data according to a Consistent Overhead Byte Stuffing (COBS) encoding scheme and inclusion of COBS encoded Ethernet data frames into a synchronous digital payload according to a third specific implementation of the present invention.

The known COBS scheme comprises a byte stuffing scheme. That is to say an extra byte of data is added to a pre-determined amount of frame data to indicate a start or end of data frame. COBS encoders are known in the prior art, and COBS encoding algorithms are disclosed in an appendix to "Consistent Overhead Byte Stuffing" by Stuart Cheshire and Mary Baker as mentioned hereinabove. In the best mode herein, application of the COBS algorithm for encoding Ethernet data frames prior to input into an SDH payload is novel. Steps for applying the COBS scheme are as illustrated schematically with reference to FIG. 14 herein. In step 1400, Ethernet data frames are input into SDH/SONET payload mapper 400 from rate adaption means 401 at synchronous or near synchronous data rates. The Ethernet data frames are encoded as a series of variable length code blocks according to the COBS coding scheme, implemented by an algorithm controlling a processor. An example of a COBS coding scheme is illustrated with reference to FIG. 15 herein. The codes illustrated in FIG. 15 have meanings which represent a sequence of data bytes contained within the code block followed by an implicit zero. The implicit zero is not actually contained within the sequence of data bytes in the code block, since the encoded data cannot contain any zero byte values. There is one exception, being the code 0xFF, which represents a run of 254 non-zero data bytes within an implicit zero on the end. This code acts as a "fail safe" allowing the COBS scheme to encode long sequences of bytes which do not contain any zeros at all. Since the byte value of zero never appears in the encoded data, a zero byte can be used to uniquely identify an end of Ethernet data frame, marking the boundary between consecutive Ethernet packets in a synchronous payload. In step 1402, as long as an end of Ethernet data frame is not detected, then the COBS encoded data bytes continue to be input into the synchronous payload in step 1403. However, if an end of Ethernet data frame code is detected in step 1402 a zero byte is appended to the end of the COBS encoded Ethernet frame data in step 1404 and then incorporated into the synchronous payload in step 1405. Decoding of COBS encoded synchronous payloads to recover Ethernet data frames is a reversal of the encoding process.

In the fifth implementation herein, encoding an Ethernet data frame using the COBS scheme has an advantage that at most, only one byte per 255 bytes is added, so irrespective of the data content of the Ethernet data frame, the coding overhead of 1 byte is always known. The total expansion of an Ethernet packet encoded using the COBS scheme is always less than the Ethernet inter-packet gap, which is of the order 12 bytes. As the Ethernet data frame has a bounded expansion of only one byte, whatever the data content of the Ethernet data frame, and an extra transmission delay due to addition of the extra byte is constant.

What is claimed is:

1. A method for transporting frame-based data into a synchronous transmission communication network payload, said method comprising the steps of:
   receiving said frame based data encoded in accordance with a frame based data protocol;
   adapting the rate of said received frame based data to a data rate suitable for inclusion in said synchronous transmission communication network payload;
   encoding at least one received data frame with a code recognizable within said synchronous transmission communication network payload as designating a boundary of said data frame, said encoding not using a frame preamble of said frame based data protocol
   inputting said encoded data frame into said synchronous transmission communication network payload for transmission on a synchronous communication channel.

2. A method as claimed in claim 1, wherein said step of adapting the rate of said received frame based data does not increase the size of the data frames.

3. A method as claimed in claim 1, wherein said frame based data protocol is selected from the group consisting of:
   an OSI-layer 2 frame based data protocol, an Ethernet protocol, an IEEE standard 802.3 frame based data protocol, an Ethernet IEEE 802.1 frame based data protocol.

4. A method as claimed in claim 1, wherein said frame based data is included in a frame based data system selected from the group consisting of:
   a token ring system, a token bus system, a fibre distributed data interface system, and a dual queue dual bus system.

5. A method as claimed in claim 1, wherein said synchronous transmission communication network payload is taken from the group consisting of:
   a SONET payload and a SDH payload.

6. A method as claimed in claim 1, wherein said step of encoding at least one received data frame comprises appending a pointer describing a position of said boundary within a data stream containing said packet data frame, said pointer appended into said synchronous data channel.

7. The method as claimed in claim 1, wherein said step of encoding at least one received data frame comprises:
   partitioning said data frame into a plurality of bytes;
   for each byte appending an extra-bit indicating that said corresponding respective byte comprises part of said data frame; and
   for a last byte of said data frame, appending an extra bit indicating that said byte constitutes a last byte of said data frame.

8. The method as claimed in claim 1, wherein said step of encoding at least one received data frame comprises applying a constant overhead byte stuffing algorithm to said data frame.

9. The method as claimed in claim 1, wherein said step of inputting said encoded data frame into said synchronous transmission communication network payload comprises inputting said data frame into at least one virtual container.

10. A method as claimed in claim 1, wherein the code identifies the type of payload content within said synchronous network payload.

11. A method as claimed in claim 1, wherein the payload data rate of said synchronous network payload is selected to match as efficiently as possible the data rate of said frame based data.

12. A method as claimed in claim 1, in which traffic comprising said frame based data is mapped to said synchronous payload at the line rate.

13. A method as claimed in claim 1, wherein said synchronous transmission communication network payload comprises a plurality of virtual containers.

14. A method of receiving frame based data carried in a synchronous transmission communication network payload, said frame based data being encoded in accordance with a frame based data protocol, said method comprising the steps of:
   recovering a stream of data from said synchronous transmission communication network payload;
   identifying in said recovered data stream at least one marker designating a boundary of a data frame encoded in accordance with said frame based data protocol, said marker being encoded in accordance with a protocol different to said frame based data protocol; and
   using said marker to recover said data frame of said frame based data protocol from said data stream.

15. A method of decoding frame based data carried over a synchronous digital channel said frame based data being encoded in accordance with a frame based data protocol, said method comprising the steps of:
   receiving said frame based data included in a synchronous network payload of said synchronous digital channel;
   decoding, using a protocol different to said frame based data protocol, said data to obtain a plurality of markers, each marker designating a boundary of a data frame encoded in accordance with said frame based data protocol; and using said markers to recover said frame based data.

16. Apparatus for incorporating frame based data encoded in accordance with a frame based data protocol into a synchronous transmission communication network payload, said apparatus comprising:

an encoder for encoding a plurality of data frames with a plurality of markers, said markers designating a boundary of one of said plurality of data frames, said markers not using a frame preamble of the frame based data protocol; and a multiplexer means for multiplexing encoded data frames into said synchronous transmission communication network payload.

17. Apparatus as claimed in claim 16, wherein said synchronous transmission communication network payload is taken from the group consisting of:

a SONET payload and a SDH payload

18. Apparatus as claimed in claim 16, wherein said frame based data conforms to a protocol selected from the group consisting of: an OSI-layer 2 frame based data protocol, an Ethernet protocol, an IEEE standard 802.3 frame based data protocol, an Ethernet IEEE 802.1 frame based data protocol.

19. Apparatus as claimed in claim 16, wherein said frame based data is included in a frame based data systems selected from the group consisting of:

a token ring system, a token bus system, a fibre distributed data interface system, and a dual queue dual bus system.

* * * * *